United States Patent
Carvell

(10) Patent No.: US 12,370,907 B2
(45) Date of Patent: Jul. 29, 2025

(54) ON-PULSE TRANSITION TIMES FOR PULSED CONTROLLED ELECTRIC MACHINES USING BOOST VOLTAGES

(71) Applicant: Tula eTechnology, Inc., San Jose, CA (US)

(72) Inventor: Paul Carvell, Santa Cruz, CA (US)

(73) Assignee: Tula eTechnology, Inc., San Jose, CA (US)

( * ) Notice: Subject to any disclaimer, the term of this patent is extended or adjusted under 35 U.S.C. 154(b) by 162 days.

(21) Appl. No.: 18/488,442

(22) Filed: Oct. 17, 2023

(65) Prior Publication Data

US 2025/0121701 A1 Apr. 17, 2025

(51) Int. Cl.
| | |
|---|---|
| *B60L 15/20* | (2006.01) |
| *B60L 15/04* | (2006.01) |
| *B60L 15/08* | (2006.01) |
| *B60W 10/08* | (2006.01) |
| *H02P 6/08* | (2016.01) |

(52) U.S. Cl.
CPC ........... *B60L 15/2045* (2013.01); *B60L 15/04* (2013.01); *B60L 15/08* (2013.01); *B60W 10/08* (2013.01); *H02P 6/08* (2013.01); *B60L 2210/14* (2013.01); *B60W 2710/083* (2013.01)

(58) Field of Classification Search
CPC ...... B60L 15/2045; B60L 15/04; B60L 15/08; B60L 2210/14; B60W 10/08; B60W 2710/083; H02P 6/08
See application file for complete search history.

(56) References Cited

U.S. PATENT DOCUMENTS

| | | |
|---|---|---|
| 4,441,043 A | 4/1984 | Decesare |
| 4,989,146 A | 1/1991 | Imajo |
| 5,099,410 A | 3/1992 | Divan |
| 5,151,637 A | 9/1992 | Takada et al. |

(Continued)

FOREIGN PATENT DOCUMENTS

| | | |
|---|---|---|
| CN | 1829070 A | 9/2006 |
| CN | 102381265 A | 3/2012 |

(Continued)

OTHER PUBLICATIONS

Cai et al., "Torque Ripple Reduction for Switched Reluctance Motor with Optimized PWM Control Strategy", https://www.mdpi.com/1996-1073/11/11/3215, Oct. 15, 2018, 27 pages.

(Continued)

*Primary Examiner* — Zoheb S Imtiaz
(74) *Attorney, Agent, or Firm* — Beyer Law Group LLP

(57) ABSTRACT

Various boost circuits that are used to improve or reduce the time needed to transition an electric machine from an off-state to an on-state at the start of a next pulse during pulsed controlled operation. With these various boost circuits, the naturally generated Back Electromotive Force or "BEMF" that is induced when an electrical machine transitions from the on state to the off state at the end of an on pulse is harvested, rectified, and stored on a storage device. The harvested energy is then made available to the electric machine as a "boost" voltage at the onset of the next on pulse, resulting in a reduced transition time from the off-state to the on-state.

35 Claims, 7 Drawing Sheets

(56) References Cited

U.S. PATENT DOCUMENTS

| | | |
|---|---|---|
| 5,325,028 A | 6/1994 | Davis |
| 5,483,141 A | 1/1996 | Uesugi |
| 5,640,073 A | 6/1997 | Ikeda et al. |
| 5,701,062 A | 12/1997 | Barrett |
| 5,731,669 A | 3/1998 | Shimizu et al. |
| 6,121,740 A | 9/2000 | Gale et al. |
| 6,291,960 B1 | 9/2001 | Crombez |
| 6,308,123 B1 | 10/2001 | Ikegaya et al. |
| 6,370,049 B1 | 4/2002 | Heikkila |
| 6,424,799 B1 | 7/2002 | Gilmore |
| 6,483,218 B1 | 11/2002 | Petrinko |
| 6,493,204 B1 | 12/2002 | Glidden et al. |
| 6,605,912 B1 | 8/2003 | Bharadwaj et al. |
| 6,829,515 B2 | 12/2004 | Grimm |
| 6,829,556 B2 | 12/2004 | Kumar |
| 6,906,485 B2 | 6/2005 | Hussein |
| 6,940,239 B2 | 9/2005 | Iwanaga et al. |
| 6,984,946 B2 | 1/2006 | Donnelly et al. |
| 7,190,143 B2 | 3/2007 | Wei et al. |
| 7,259,664 B1 | 8/2007 | Cho et al. |
| 7,327,545 B2 | 2/2008 | Konishi |
| 7,411,801 B2 | 8/2008 | Welchko et al. |
| 7,453,174 B1 | 11/2008 | Kalsi |
| 7,558,655 B2 | 7/2009 | Garg et al. |
| 7,577,511 B1 | 8/2009 | Tripathi et al. |
| 7,616,466 B2 | 11/2009 | Chakrabarti et al. |
| 7,768,170 B2 | 8/2010 | Tatematsu et al. |
| 7,852,029 B2 | 12/2010 | Kato et al. |
| 7,960,888 B2 | 6/2011 | Ai et al. |
| 7,969,341 B2 | 6/2011 | Robbe et al. |
| 8,020,651 B2 | 9/2011 | Zillmer et al. |
| 8,099,224 B2 | 1/2012 | Tripathi et al. |
| 8,744,656 B2 | 6/2014 | Sato et al. |
| 8,768,563 B2 | 7/2014 | Nitzberg et al. |
| 8,773,063 B2 | 7/2014 | Nakata |
| 8,841,876 B2 | 9/2014 | Leaver et al. |
| 9,046,559 B2 | 6/2015 | Lindsay et al. |
| 9,050,894 B2 | 6/2015 | Banerjee et al. |
| 9,308,822 B2 | 4/2016 | Matsuda |
| 9,495,814 B2 | 11/2016 | Ramesh |
| 9,512,794 B2 | 12/2016 | Serrano et al. |
| 9,630,614 B1 | 4/2017 | Hill et al. |
| 9,702,420 B2 | 7/2017 | Yoon |
| 9,758,044 B2 | 9/2017 | Gale et al. |
| 9,948,173 B1 | 4/2018 | Abu Qahouq |
| 10,060,368 B2 | 8/2018 | Pirjaberi et al. |
| 10,081,255 B2 | 9/2018 | Yamada et al. |
| 10,256,680 B2 | 4/2019 | Hunstable |
| 10,273,894 B2 | 4/2019 | Tripathi |
| 10,291,168 B2 | 5/2019 | Fukuta |
| 10,291,174 B2 | 5/2019 | Irie et al. |
| 10,320,249 B2 | 6/2019 | Okamoto et al. |
| 10,340,821 B2 | 7/2019 | Magee et al. |
| 10,344,692 B2 | 7/2019 | Nagashima et al. |
| 10,381,968 B2 | 8/2019 | Agirman |
| 10,476,421 B1 | 11/2019 | Khalil et al. |
| 10,550,776 B1 | 2/2020 | Leone et al. |
| 10,742,155 B2 | 8/2020 | Tripathi |
| 10,763,772 B1 | 9/2020 | Fatemi et al. |
| 10,944,352 B2 | 3/2021 | Mazda et al. |
| 11,077,759 B1 | 8/2021 | Srinivasan |
| 11,088,644 B1 | 8/2021 | Carvell |
| 11,133,763 B1 | 9/2021 | Islam |
| 11,133,767 B2 | 9/2021 | Serrano et al. |
| 11,167,648 B1 | 11/2021 | Carvell et al. |
| 11,228,272 B2 | 1/2022 | Tripathi |
| 11,345,241 B1 | 5/2022 | Cai |
| 11,427,177 B2 | 8/2022 | Serrano et al. |
| 11,557,996 B1 | 1/2023 | Arvanitis |
| 11,623,529 B2 | 4/2023 | Carvell et al. |
| 11,626,827 B2 | 4/2023 | Tripathi |
| 11,628,730 B2 | 4/2023 | Srinivasan |
| 11,637,513 B2 | 4/2023 | Phillips et al. |
| 11,673,476 B2 | 6/2023 | Cai |
| 11,695,361 B2 | 7/2023 | Carvell et al. |
| 12,206,346 B2 | 1/2025 | Carvell et al. |
| 12,301,149 B2 | 5/2025 | Tripathi |
| 2001/0039926 A1 | 11/2001 | Kobayashi et al. |
| 2002/0043954 A1 | 4/2002 | Hallidy et al. |
| 2005/0127861 A1 | 6/2005 | McMillan et al. |
| 2005/0151437 A1 | 7/2005 | Ramu |
| 2005/0160771 A1 | 7/2005 | Hosoito et al. |
| 2007/0216345 A1 | 9/2007 | Kanamori |
| 2007/0287594 A1 | 12/2007 | DeGeorge et al. |
| 2008/0129243 A1 | 6/2008 | Nashiki |
| 2008/0179980 A1 | 7/2008 | Dawsey et al. |
| 2009/0045691 A1 | 2/2009 | Ichiyama |
| 2009/0058592 A1 | 3/2009 | Leghissa et al. |
| 2009/0121669 A1 | 5/2009 | Hanada |
| 2009/0128072 A1 | 5/2009 | Strong et al. |
| 2009/0146615 A1 | 6/2009 | Zillmer et al. |
| 2009/0179608 A1 | 7/2009 | Welchko et al. |
| 2009/0306841 A1 | 12/2009 | Miwa et al. |
| 2010/0010724 A1 | 1/2010 | Tripathi et al. |
| 2010/0066299 A1 | 3/2010 | Izumi et al. |
| 2010/0201294 A1 | 8/2010 | Yuuki et al. |
| 2010/0296671 A1 | 11/2010 | Khoury et al. |
| 2011/0029179 A1 | 2/2011 | Miyazaki et al. |
| 2011/0031922 A1* | 2/2011 | Sakai ............... H02P 27/08 318/519 |
| 2011/0089774 A1 | 4/2011 | Kramer |
| 2011/0101812 A1 | 5/2011 | Finkle et al. |
| 2011/0130916 A1 | 6/2011 | Mayer |
| 2011/0208405 A1 | 8/2011 | Tripathi et al. |
| 2012/0056569 A1 | 3/2012 | Takamatsu et al. |
| 2012/0112674 A1 | 5/2012 | Schulz et al. |
| 2012/0169263 A1 | 7/2012 | Gallegos-Lopez et al. |
| 2012/0217916 A1 | 8/2012 | Wu et al. |
| 2012/0217921 A1 | 8/2012 | Wu et al. |
| 2013/0002173 A1 | 1/2013 | Baglino et al. |
| 2013/0062138 A1 | 3/2013 | Naitou et al. |
| 2013/0119814 A1 | 5/2013 | Burch et al. |
| 2013/0134912 A1 | 5/2013 | Khalil et al. |
| 2013/0141027 A1 | 6/2013 | Nakata |
| 2013/0226420 A1 | 8/2013 | Pedlar et al. |
| 2013/0241445 A1 | 9/2013 | Tang |
| 2013/0258734 A1 | 10/2013 | Nakano et al. |
| 2013/0314021 A1 | 11/2013 | Yamada et al. |
| 2014/0018988 A1 | 1/2014 | Kitano et al. |
| 2014/0028225 A1 | 1/2014 | Takamatsu et al. |
| 2014/0042939 A1* | 2/2014 | Kobayashi ........ H02P 27/08 318/400.3 |
| 2014/0130506 A1 | 5/2014 | Gale et al. |
| 2014/0139156 A1* | 5/2014 | Hayashi ............ H02P 21/02 318/400.3 |
| 2014/0176034 A1 | 6/2014 | Matsumura et al. |
| 2014/0217940 A1 | 8/2014 | Kawamura |
| 2014/0265957 A1 | 9/2014 | Hu et al. |
| 2014/0292382 A1 | 10/2014 | Ogawa et al. |
| 2014/0354199 A1 | 12/2014 | Zeng et al. |
| 2015/0025725 A1 | 1/2015 | Uchida |
| 2015/0236628 A1 | 8/2015 | Wang et al. |
| 2015/0240404 A1 | 8/2015 | Kim et al. |
| 2015/0246685 A1 | 9/2015 | Dixon et al. |
| 2015/0261422 A1 | 9/2015 | Den et al. |
| 2015/0297824 A1 | 10/2015 | Cabiri et al. |
| 2015/0318803 A1 | 11/2015 | Wu et al. |
| 2016/0114830 A1 | 4/2016 | Dixon et al. |
| 2016/0226409 A1 | 8/2016 | Ogawa |
| 2016/0233812 A1 | 8/2016 | Lee et al. |
| 2016/0269225 A1 | 9/2016 | Kirchmeier et al. |
| 2016/0373047 A1 | 12/2016 | Loken et al. |
| 2017/0087990 A1 | 3/2017 | Neti et al. |
| 2017/0163108 A1 | 6/2017 | Schencke et al. |
| 2017/0331402 A1 | 11/2017 | Smith et al. |
| 2018/0032047 A1 | 2/2018 | Nishizono et al. |
| 2018/0045771 A1 | 2/2018 | Kim et al. |
| 2018/0154786 A1 | 6/2018 | Wang et al. |
| 2018/0276913 A1 | 9/2018 | Garcia et al. |
| 2018/0323665 A1 | 11/2018 | Chen et al. |
| 2018/0334038 A1 | 11/2018 | Zhao et al. |
| 2019/0058374 A1 | 2/2019 | Enomoto et al. |
| 2019/0288629 A1 | 9/2019 | Tripathi |
| 2019/0288631 A1 | 9/2019 | Tripathi |

(56) References Cited

U.S. PATENT DOCUMENTS

| | | |
|---|---|---|
| 2019/0341820 A1 | 11/2019 | Krizan et al. |
| 2020/0212834 A1 | 7/2020 | Mazda et al. |
| 2020/0262398 A1 | 8/2020 | Sato et al. |
| 2020/0328714 A1 | 10/2020 | Tripathi |
| 2020/0343849 A1 | 10/2020 | Coroban-Schramel |
| 2020/0366223 A1 | 11/2020 | Coroban-Schramel |
| 2021/0146909 A1 | 5/2021 | Serrano et al. |
| 2021/0203263 A1 | 7/2021 | Serrano et al. |
| 2021/0351733 A1 | 11/2021 | Carvell |
| 2022/0094290 A1 | 3/2022 | Carvell |
| 2022/0234451 A1 | 7/2022 | Srinivasan |
| 2022/0416707 A1 | 12/2022 | Chen |
| 2023/0114289 A1 | 4/2023 | Islam et al. |
| 2023/0211672 A1 | 7/2023 | Srinivasan |
| 2023/0219426 A1 | 7/2023 | Carvell et al. |
| 2023/0223885 A1 | 7/2023 | Tripathi |
| 2023/0253911 A1 | 8/2023 | Islam |
| 2023/0283211 A1 | 9/2023 | Carvell |
| 2023/0308040 A1 | 9/2023 | Farah et al. |
| 2024/0372489 A1 | 11/2024 | Srinivasan |
| 2025/0055397 A1 | 2/2025 | Chen et al. |
| 2025/0115136 A1 | 4/2025 | Srinivasan |

FOREIGN PATENT DOCUMENTS

| | | |
|---|---|---|
| CN | 104716754 A | 6/2015 |
| CN | 204589885 U | 8/2015 |
| CN | 105196877 A | 12/2015 |
| CN | 205229379 U | 5/2016 |
| CN | 106932208 A | 7/2017 |
| CN | 107067780 A | 8/2017 |
| CN | 207129052 U | 3/2018 |
| CN | 108216026 A | 6/2018 |
| CN | 108445386 A | 8/2018 |
| CN | 110212725 | 9/2019 |
| DE | 102014206342 | 10/2015 |
| EP | 2605398 A1 | 6/2013 |
| FR | 2989479 | 10/2013 |
| GB | 2273212 | 8/1994 |
| JP | 10243680 | 9/1998 |
| JP | 2008-079686 A | 4/2008 |
| JP | 2009-065758 A | 3/2009 |
| JP | 2011-67043 | 3/2011 |
| JP | 2012-228134 | 11/2012 |
| JP | 5165660 B2 | 12/2012 |
| JP | 2014-033449 A | 2/2014 |
| JP | 5857472 B2 | 12/2015 |
| JP | 2017-011970 A | 1/2017 |
| JP | 2017-200382 | 11/2017 |
| JP | 2018-033250 A | 3/2018 |
| JP | 2020048254 A | 3/2020 |
| JP | 2022/020123 | 2/2022 |
| KR | 10-2013-0095773 | 8/2013 |
| KR | 10-2017-0021146 A | 2/2017 |
| KR | 10-2017-0032976 A | 3/2017 |
| WO | WO03/36787 A1 | 5/2003 |
| WO | WO2012-010993 A2 | 1/2012 |

OTHER PUBLICATIONS

Spong et al., "Feedback Linearizing Control of Switched Reluctance Motors", IEEE Transactions on Automatic Control, vol. AC-32, No. 5, May 1987, pp. 371-379.

Mirzaeva et al., "The use of Feedback Quantizer PWM for Shaping Inverter Noise Spectrum", Power Electronics and Motion Control Conference (EPE/PEMC), 2012 15th International IEEE, Sep. 4, 2012, pp. DS3c. 10-1, XP032311951, DOI: 10.1109/EPEPEMC. 2012.6397346, ISBN: 978-1-4673-1970.6.

Luckjiff et al., "Hexagonal ΣΔ Modulators in Power Electronics", IEEE Transactions on Power Electronics, Institute of Electrical and Electronics Engineers, USA, vol. 20, No. 5, Sep. 1, 2005, pp. 1075-1083, XP011138680, ISSN: 0885-8993, DOI: 10.1109/TPEL. 2005.854029.

Ramsey, "How This Father and Son's New Electric Turbine Could Revolutionize Electric Cars; Hunstable Electric Turbine can produce up to Three Times the Torque of Any Other Motor", https://www.parsintl.com/publication/autoblog/, Mar. 8, 2020.

Phillips, U.S. Appl. No. 18/305,776, filed Apr. 24, 2023.
Phillips, U.S. Appl. No. 18/348,255, filed Jul. 6, 2023.
Carvell et al., U.S. Appl. No. 18/362,602, filed Jul. 31, 2023.
Parsels et al., U.S. Appl. No. 18/452,363, filed Aug. 18, 2023.
Islam et al., U.S. Appl. No. 18/452,050, filed Aug. 18, 2023.
Islam et al., U.S. Appl. No. 18/452,260, filed Aug. 18, 2023.

* cited by examiner

ON-PULSE TRANSITION TIMES FOR PULSED CONTROLLED ELECTRIC MACHINES USING BOOST VOLTAGES

BACKGROUND

The present application relates generally to pulsed control of electric machines, and more particularly, to various boost circuits that rely on Back Electromagnetic Force (BEMF) for boosting inverter bus voltages above the power supply voltage normally used to energize the bus. With the addition of the boost voltage, the rise time of the electric machine when transitioning from an off state to an on state at the start of an on pulse is significantly reduced relative to if no boost voltage is applied.

Electric machines have relatively high energy conversion efficiencies, provided they are operating at or near their optimal operational load. When operating below their optimal operation load, however, their energy conversion efficiency is considerably lower. Since in many applications electric machines are required to operate below their optimal operational load, the overall operational efficiency of the machine is lower than it can be, which means energy is wasted.

Pulse control of electric machines is a known approach to improving efficiency. Under operating conditions below a peak efficiency range or some other threshold, the electric machine is intermittently transitioned from an off state to an on state during pulsed operation. By controlling the magnitude, duty cycle, and frequency of the on pulses, the electric machine can be controlled to generate a needed output, while operating only within in its peak efficiency range. Between the on pulses, the electric machines generates no or little output. As a result, the overall efficiency of the electric machine when operating below the peak efficiency range or threshold is improved compared to conventional continuous operation.

An issue with pulsed machine controlled machines is that a relatively large amount of energy and time is required to transition a given electric machine from the off state to the on state with each on pulse.

A need therefore exists to transition pulsed controlled electric machines quickly and efficiently from the off state to the on state with each pulse, thereby operating such electric machines at even higher levels of efficiency.

SUMMARY

The present application is directed to various boost circuits that are used to improve or reduce the time needed to transition an electric machine from an off-state to an on-state at the start of a next pulse during pulsed controlled operation. With these various boost circuits, the naturally generated Back Electromotive Force or "BEMF" that is induced when an electrical machine transitions from the on state to the off state at the end of an on pulse is harvested, rectified, and stored on a storage device. The harvested energy is then made available to the electric machine as a "boost" voltage at the onset of the next on pulse, resulting in a reduced transition time from the off-state to the on-state.

The various boost circuits as described herein are applicable to a wide variety of different types of electric machines, including but not limited to Interior Permanent Magnet Synchronous Machine IPMSM), Surface Permanent Magnet Synchronous Machine (SPMSM), Synchronous Reluctance Machine (SynRM), Electrically Excited Synchronous Machines (EESMs), or Inductance Machines (IM).

In addition, the various boost circuits as described herein are also applicable to any end use where pulsed electric machine control is desirable. Two non-exclusive examples include both electric or hybrid vehicles.

BRIEF DESCRIPTION OF THE DRAWINGS

The invention and the advantages thereof, may best be understood by reference to the following description taken in conjunction with the accompanying drawings in which.

Like reference numerals in the drawings are sometimes used to designate like structural elements. It should also be appreciated that the depictions in the figures are diagrammatic and not to scale.

DETAILED DESCRIPTION

Figure 1:
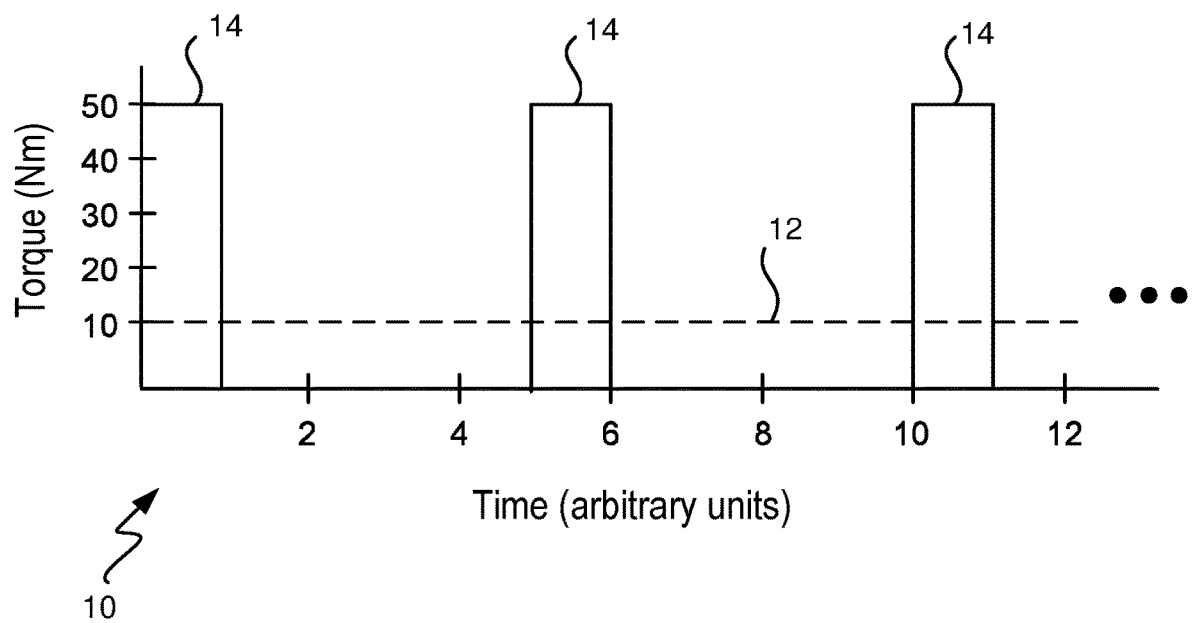
FIG. 1 is graph illustrating pulsed operation of a machine in accordance with a non-exclusive embodiment of the invention.

Electric motors and generators are used in a very wide variety of applications and under a wide variety of operating conditions. In general, many modern electric machines have relatively high energy conversion efficiencies. However, the energy conversion efficiency of most electric machines can vary considerably based on their operational load. In general, when operating at or near their peak operational loads, electrical machines are highly efficient. However, when operating at lower load, efficiency tends to be much lower.

The present application relates generally to pulsed control of electric machines (e.g., electric motors and generators) to improve their energy conversion efficiency when operating conditions warrant. More specifically, under lower load operating conditions, an electric machine is pulsed controlled and intermittently transitioned between an off state and an on state during pulses. By controlling the magnitude, duty cycle and frequency of the pulses, the electric machine can be controlled to operate only at its higher efficiency levels compared to conventional continuous machine control, thereby delivering a desired average torque output in a more energy efficient manner than previously possible.

The Applicant has filed and received several U.S. Patents covering the pulsed control of electric machine, including U.S. Pat. No. 10,742,155 (TULA P200B), U.S. Pat. No.

11,228,272 (TULA P200C), and U.S. Pat. No. 10,944,352 (TULA P201). Each of the above-listed applications are incorporated by reference herein for all purposes.

Electric Machines

Electric machines have a stator and a rotor. The stator is typically stationary, while the rotor rotates.

The stator, which is typically round in shape, includes a number of fixed coils. These coils are powered by phased alternating signal (AC) electrical signals. As the phased AC signals are applied, a rotating magnetic field is created. The rotational speed of the magnetic field depends on the frequency of the AC electrical signals. For example, with a three-phase electric machine, the stator has three fixed coiled, each fixed approximately 120° degrees apart. Three phased AC signals, typically sine waves are applied to the three fixed coils, approximately 120° degrees apart. As a result, a rotating magnetic field is created having a speed equal to the frequency of the three phased AC signals.

The rotor, on the other hand, has coils that are arranged in North-South poles. Depending on the type of electric machine, the coils are either permanent magnets or externally excited by a direct-current. Either way, a magnetic field of alternating polarity is created. With this arrangement, the opposite poles of the stator and the rotor attract one another so that the magnetic field of the stator rotates and attracts the rotor, causing the rotor to rotate at the same speed as magnetic field of the stator. Hence, the rotor is synchronized with the speed of the stator and the phased AC signals used to drive the stator.

Pulsed Machine Control

Referring to FIG. 1, a graph 10 illustrating the basic operation of pulsed machine control is illustrated. In this example, several assumptions are made, including:

The electric machine is operating as an electric motor.

As plotted along the vertical axis, the maximum torque output of the machine is 50 Nm.

The peak efficiency range of the machine is approximately 95% of its peak output, or a torque output of approximately 47.5 Nm.

The machine is requested, in this example, to generate an output toque of 10 Nm, which is well below its peak efficiency range.

With conventional operation, the machine is continuously operated to generate the requested torque output of 10 Nm. This is represented in FIG. 1 by the dashed line 12. The disadvantage of continuously operating with a torque output of 10 is that the machine is operating well below its peak efficiency range (e.g., 47.5 Nm or above in this example).

With pulsed operation on the other hand, the machine is pulsed on and off. Between on pulses, the machine is in the off state and generates little to no torque output. During the on pulses, the machine:

(1) Is in the on state and operates at or near its peak efficiency (i.e., at 50); and (2) The average torque output of the machine over time, during which the machine is intermittently pulsed between the off and on states, is sufficient to meet the ascertained torque request.

In this example, the frequency of the on pulses occur once every five (5) time units as plotted along the horizontal axis. As a result, the machine is pulsed on twenty percent (20%) of the time, as represented by the pulses 14. By operating the machine at its peak output (e.g., 50) every fifth time unit (i.e., twenty percent twenty percent (20%) of the time), the requested 10 Nm of torque is generated over time. However, since the machine is operated only at or near its peak efficiency during the on pulses, the overall operating efficiency of the machine is significantly improved over conventional continuous operation.

Power Converter

Figure 2:
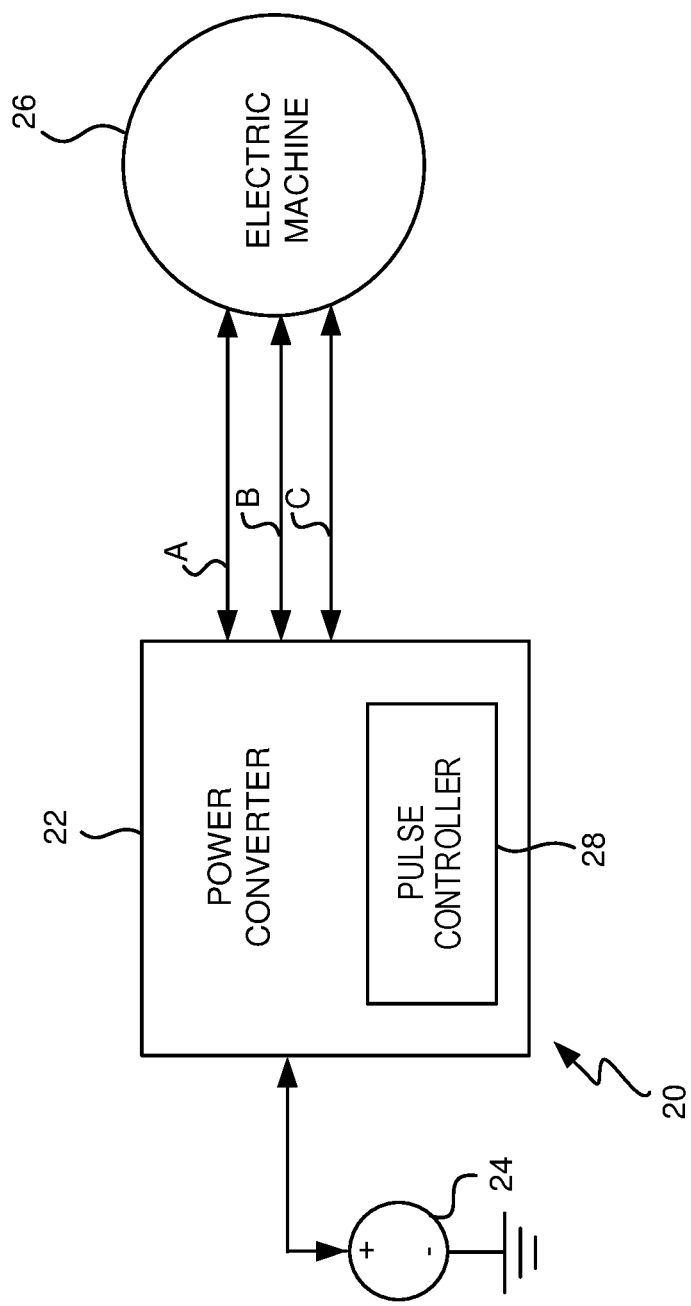
FIG. 2 is a functional block diagram illustrating a machine controller architecture in accordance with a non-exclusive embodiment of the invention.

Referring to FIG. 2, a diagram of a power controller 20 for pulsed operation of an electric machine is illustrated. The power controller 20 includes a power converter 22, a DC power supply 24, and an electric machine 26. The power converter 22 is responsible for converting the direct-current power from the DC power supply 24 and converting it into phased AC signals that are used to drive the coils of the stator of the electric machine 26. In the particular embodiment shown, the electric machine has three phases, and the corresponding phased AC signals are labelled as phase "A", phase "B", and phase "C" respectively. The three-phased input power, denoted as phase A, phase B, and phase C, is applied to the windings of the stator of the electric machine 26 for generating the rotating magnetic field as described above.

In this non-exclusive embodiment, the power converter 22 also includes a pulse controller 28. As described in more detail below, the pulse controller 28 determines when the electric machine is to be operated in a continuous mode or a pulsed mode. During conventional (i.e., continuous) operation of the electric machine as a motor, the three-phases A, B and C provided to the coils of the stator are continuous (i.e., not pulsed). During pulsed operation, the three-phases A, B and C and the rotor current, are selectively pulsed.

The power converter 22 may be operated as a power inverter or power rectifier depending on the direction of energy flow through the system.

The lines depicting the phases, A, B, and C are shown with arrows on both ends indicating that current can flow both from the power converter 22 to the electric machine 26 when the machine is operating as a motor, or that current can flow in the opposite direction when the machine is used as a generator.

When the electric machine is operating as generator, the power converter 22 operates as a power rectifier and the AC power coming from the electric machine 26 is converted to DC power and is stored in the DC power supply 24. The rotor field needed to enable this transfer of power has to be supplied by the inverter. Again, operation of electric machine 26 as a generator can be either continuous or pulsed.

Pulse Controller Operation

Figure 3:
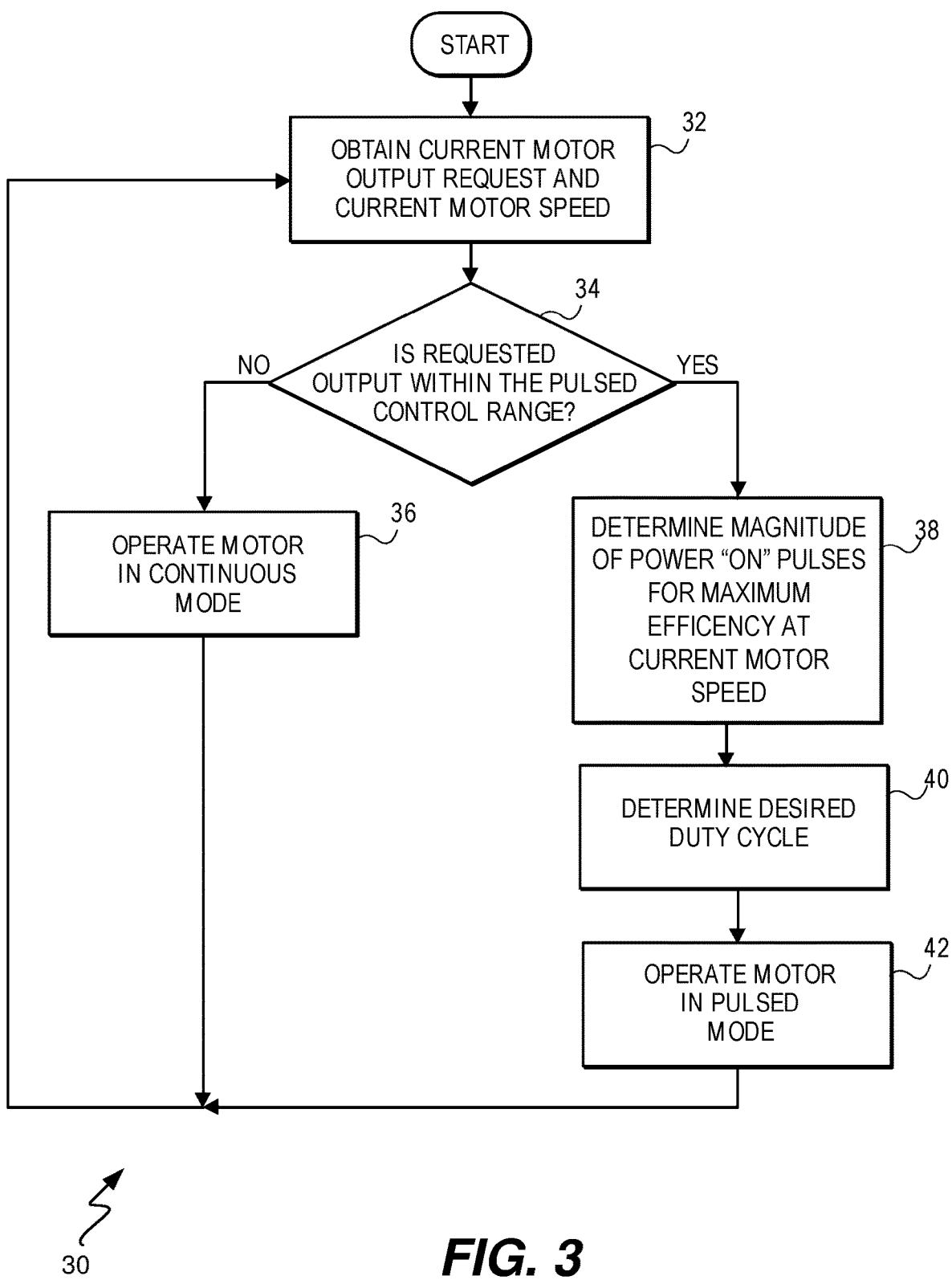
FIG. 3 is an operational flow diagram illustrating steps implemented by the machine controller in accordance with a non-exclusive embodiment of the invention.

Referring to FIG. 3, a flow diagram 30 illustrates steps implemented by the pulse controller 28 for pulsed control operation of the electric machine 26 while operating as an electric motor are shown.

In the initial step 32, the current machine output request and current machine speed are ascertained.

In decision step 34, a determination is made based on the current machine output request and current machine speed if the machine 26 should be operated in a continuous mode or a pulsed mode. In other words, a determination is made if the desired machine torque is within a pulse control range. In various embodiments, the pulse control range may be (a) a predetermined threshold, (b) an efficiency target level, (c) an efficiency target level that is modified for some other consideration, such as Noise Vibration and Harshness (NVH), or (d) any combination thereof. For example, if a certain efficiency threshold calls for pulsed operation, but would otherwise cause excessive amounts of NVH, then the pulse control range may be modified to mitigate the excessive levels of NVH.

In step 36, the machine is operated continuously in a continuous mode if the current machine torque request is above the pulse control range for the current machine speed and/or torque request.

In the alternative step 38, the machine is operated in the pulsed mode if the current machine torque request is below the pulse control range the pulse control range for the current machine speed and/or torque request.

In step 40, the desired pulse magnitude, duty cycle and frequency for operation in the pulsed mode are determined so that the average output during the on pulses over time matches the desired output.

In step 42, the machine is operated in the pulsed mode using the determined pulse magnitude, duty cycle and frequency of the pulses.

The above steps 32-42 are continuously performed while the machine is in operation. At any given machine speed, there will be a corresponding pulse control range, which may be fixed over a wide range of speeds, or which may widely vary. As the instantaneous machine torque request and/or current machine speed change, a decision is made to operate the machine in either the continuous or pulsed mode as appropriate.

From a conceptual standpoint, the more often the machine operates in the pulsed mode, the more significant the overall efficiency of the machine can be realized via pulsed operation relative to conventional continuous operation.

Pulse Rise Times

Current power converters are typically designed for continuous, not pulsed operation. Such power converters are typically required to transition from the unenergized state to an energized state relatively infrequently. As a result, little design effort has been made to date in managing the transition time between when a machine is off to when it is turned on. To the extent any such efforts have been made, the focus is typically directed to achieving a smooth transition as opposed to a fast transition. The transition from a non-energized (off) to an energized state for most electric machines is therefore, relatively not very fast.

The applicants have discovered that for an electric machine system that frequently transitions from a non-energized state to high efficiency state, such as with pulsed operation, further efficiency improvements can be realized when the transitions occur as fast as possible. With fast transitions, for example from zero output to the peak or some other high efficiency threshold, the overall average efficiency is improved because the machine spends less time in transition where efficiency is less than the peak or the threshold. This relationship is depicted in Figure. 4A and FIG. 4B.

Figure 4A:
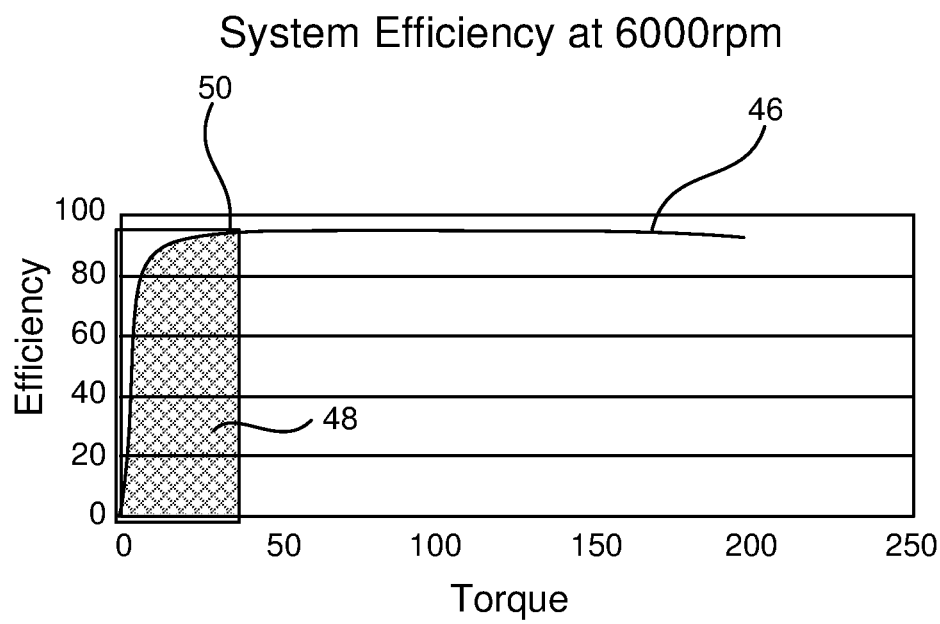
FIG. 4A is a torque versus efficiency map for a machine operating at a fixed speed during a transition from zero to peak efficiency torque.

Referring to FIG. 4A, a torque versus efficiency map for an exemplary electric machine operating as a motor at a fixed speed (e.g., 6000 rpms) is illustrated. In the exemplary map, a range of torque outputs from 0.0 Nm to 250 Nm is plotted along the horizontal axis, while the efficiency of the machine from 0.0 percent to 100 percent is plotted along the vertical axis. Curve 46 depicts the transition of the machine from zero to peak efficiency torque. During this transition, as depicted by the shaded region 48, the machine is operating at a much lower efficiency before reaching at or near the peak efficiency of the machine as depicted by reference number 50.

Figure 4B:
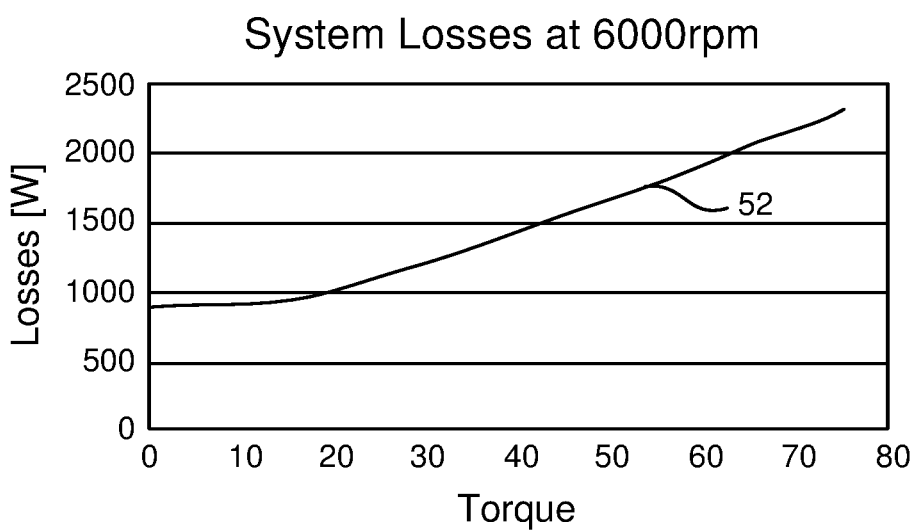
FIG. 4B is a torque versus work lost for an exemplary machine operating at a fixed speed during a transition from zero to peak efficiency torque.

Referring to FIG. 4B, a map is provided illustrating torque versus work lost for an exemplary machine operating at a fixed speed during a transition from zero to peak efficiency torque. In this map, the work losses (W) are plotted along the vertical axis, while the torque output of the machine is plotted along the horizontal axis. As demonstrated by curve 52, the work losses of the machine increase as the torque output increases during the transition from zero to peak efficiency torque. Therefore, the faster the transition time from zero to peak efficiency torque, the less work is performed, and the less energy is consumed by the electric machine.

By substituting time in place of torque along the horizontal axis and then integrating the area under curve 52, the energy consumed by the electric machine can be calculated for a given transition time. For instance, with an exemplary machine, 7234.5 Joules of energy is used with a transition time of 0.5 seconds, while only 723.4 Joules of energy were used a transition time of 0.05 second. This comparison demonstrates that the faster the transition time from zero to peak efficiency torque, the lower the energy consumed in losses. It should be noted that with this example, it is assumed that no acceleration of the load has taken place, so no energy has been added to the load. Just as efficiency is increased by reducing rise time, efficiency can also be increased by reducing pulse fall times as well.

For different machines, the transition of the machine from zero to peak efficiency torque, the peak efficiency torque and the work losses will all vary. The maps of FIGS. 4A and 4B should, therefore, be viewed as merely exemplary and should not be construed as limiting in any regard.

Back Electromotive Force (BEMF)

Back Electromotive Force or "BEMF" is a voltage generated by rotation of the rotor that opposes the voltage applied generated by the three phase AC signals used to energize the coils of the stator. In accordance with Lenz's law, the direction of an electric current induced in a conductor by a changing magnetic field opposes the change in flux, which results in a mechanical force in the direction that opposes the rotational direction of the rotor. BEMF thus creates a drag force on the rotation of the rotor.

With any given electric machine, physics ultimately limits how fast a zero to on pulse transition can be. In general, the transition speed is based on the physics of how fast the electric fields can be built up in the electric machine, which in turn, are limited by the externally applied voltage to the electric machine, electric motor back emf ("BEMF") and the inductances of the electric machine. For Synchronous Permanent Magnet or Internal Permanent Magnet 3 phase machines this would be the stator inductances but for an Electrically Excited Synchronous Machine, Induction Machines (IM) and similar electric machines this also includes the rotor inductance. rotor and/or stator windings. For a detailed discussion of the instantaneous calculation of BEMF per phase of an electric machine, see the above-mentioned U.S. Pat. No. 10,944,352 (TULA P201), incorporated by reference herein.

Electric Vehicle and Hybrid Applications

In the electric vehicle (EV) industry, both permanent magnet synchronous machines and Electrically Excited Synchronous Machines (EESMs) are commonly used. Regardless of the type of machine used, EV manufacturers are striving for greater efficiency. In other words, the longer the range of the vehicle before a re-charge is needed, the better. Accordingly, improving the efficiency of synchronous machines, both permanent and EESMs, is therefore desirable. One such approach to improving efficiency is pulsed machine control as described herein. With pulsed control, the decision to operate in either the continuous mode or the pulse mode is typically made by comparing a current torque demand with a peak or near peak efficiency threshold of a given electric machine. If the demand is above the threshold, then the machine is operated in continuous mode. If less than the threshold, then in the pulsed mode. In yet other embodiments, the threshold may be adjusted to consider real-world factors, such as Noise Vibration and Harshness (NVH). If operating in the pulsed mode for a given threshold results in excessive NVH, then the threshold may be adjusted so that the machine is operated in the continuous mode. Also, factors that either mask or accentuate NVH may also be used to adjust the threshold either up or down. For instance if a road surface is very rough, or the windows of the vehicle are opened, any NVH by operating the machine in the pulsed mode may be masked out. Alternatively, if the road is very smooth, the windows are closed, the radio is off, then these factors will accentuate NVH. Accordingly, the threshold may be adjusted as needed to use pulsed control either more or less aggressively.

Prior Boost Circuits

In U.S. Pat. No. 10,944,352 (TULA P201), assigned to the assignee of the present application, a boost circuit for improving the rise times of on pulses during pulsed operation of an electric machine is disclosed. As best illustrated in FIG. 8 of this patent, a power converter circuit includes a boost circuit comprising a pair of switches SA and SB and a capacitor C1. The switches SA and SB are controlled by a pulse controller. When switch SA is turned on, a positive power supply voltage ($+V_{DC}$) is coupled to ($+V_{BUS}$) of the power inverter. When switch SB is turned on, a negative power supply voltage ($-V_{DC}$) is coupled to ($-V_{BUS}$) of the power inverter. During operation in the pulsed mode, the pulse controller turns on switches SA and SB on and off. During on pulses, SA and SB are switched on, allowing the power converter to generate and apply three-phase AC power to the electric machine from the power supply. Between the on pulses, the switches SA and SB are off, and no energy is provided to the electric machine. The capacitor C1 of the boost circuit is provided to improve the rise times of the on pulses. At the end of a pulse, energy from the electric machine is stored on the capacitor C1. During the ramp-up for the next pulse, the energy stored in C1 is applied to the positive ($+V_{BUS}$) of the power inverter. The voltage on ($+V_{BUS}$) is, therefore, higher than positive power supply voltage ($+V_{DC}$). With this extra "boost" voltage, the time for the electric machine to transition from the off state to the on is faster relative if no boost voltage is applied.

The above-mentioned U.S. Pat. No. 10,944,352 concentrates on generating a fixed boot voltage irrespective of the natural BEMF generated by the electric machine. In contrast, the invention of the present application seeks to address this by recognizing that if the natural generated BEMF of the electric machine is greater than the power supply voltage (e.g. a battery) then similar boost circuitry as described in U.S. Pat. No. 10,944,352 will rectify this BEMF, thereby adding to the production of a boost voltage.

The naturally rectified BEMF voltage may be enough to support a fast turn on transition by itself or it may need additional boost voltage that can be provided as described in U.S. Pat. No. 10,944,352. The natural BEMF is generated by the rotor flux and the speed of that rotor. This approach of harvesting and storing the natural BEMF as a boost circuit is applicable to both permanent magnet and non-permanent magnet electric machines.

Non-Permanent Magnet Machines

Non-Permanent magnet types of machines do not simply turn off. Instead, residual rotor flux remains when these types of electric machines are de-energized. When a non-Permanent machine is de-energized, the natural decay of the rotor flux causes a naturally occurring BEMF. In accordance with the present invention, this energy at the end of an on pulse, as the electric machine transitions from the on state to the off state, is harvested and stored on a bus of the power converter by rectifying the BEMF and then storing the energy on a storage device, such as on a capacitor. The stored energy is thus available as a "boost" voltage to reduce the transition time from the off state to the on state with the onset of the next on pulse relative to if no boost voltage is applied.

Permanent Magnet Machines

Permanent magnet machines have permanent magnets in their rotor. During operation, the permanent magnets generate a constant magnetic field in the rotor, which follows the rotating field of the stator. There are generally two types of permanent magnet machines, Interior Permanent Magnet Synchronous Machines (IPMSM) and Surface Permanent Magnet Synchronous Machines (SPMSM). Permanent magnet machines are highly efficient. However, these types of machines also often rely on rare earth metals, such as neodymium for their magnets. Such metals often are mined from countries other than the United States, which makes the material both expensive and sometimes subject to supply issues.

Figure 5A:
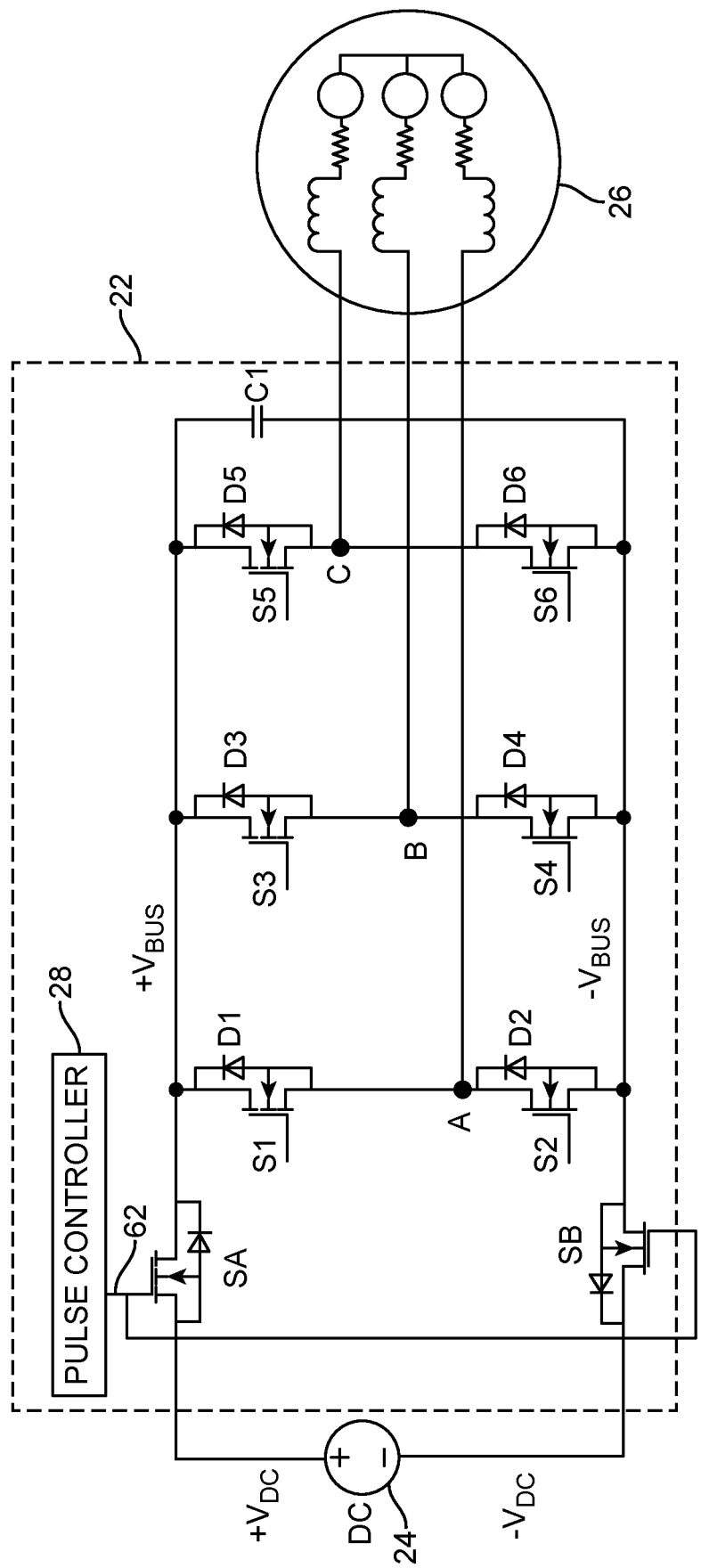
FIG. 5A illustrates an exemplary boost circuit for permanent magnet type electric machines in accordance with a non-exclusive embodiment of the present invention respectively.

Referring to FIG. 5A, an exemplary boost circuit for an electric machine is shown. This non-exclusive embodiment includes a power converter 22 including three pairs of switches S1-S2, S3-S4 and S5-S6, three pairs of diodes D1-D2, D3-D4, and D5-D6 each pair in parallel with the switches S1-S2, S3-S4 and S5-S6 respectively, a DC power source 24, a electric machine 26, a pulse controller 28, and a boost circuit including capacitor C1 coupled between the power rails ($+V_{BUS}$) and ($-V_{BUS}$) of the power converter 22, a pair of switches SA and SB, and a control signal 62, generated by the pulse controller 28, for controlling operation of switches SA and SB. In various embodiments, only one of switches SA or SB may be used, or as illustrated, both switches SA and SB are used.

When the electric machine 26 is operating as a motor, regardless if in the continuous mode or during on pulses in the pulsed mode, the three pairs of switches S1-S2, S3-S4 and S5-S6 provide three-phase AC power (labelled A, B and C) to the electric machine 26 as is well known in the art. When off, such as between on pulses, the pulse controller 28 controls the switches SA and/or SB to disconnect the power rails ($+V_{BUS}$) and ($-V_{BUS}$) from the supply voltage 24. As a result, no energy is provided to the electric machine 26. When operating as a generator, the power converter 22 operates as a power rectifier and the AC power coming from the electric machine 26 is converted to DC power and is stored in the power supply 24.

In a traction system, such as an electric or hybrid vehicle, the torque demand is typically (but not necessarily) modified by the system using any of a variety of operating factors, such as but not limited to temperature, bus voltage, speed etc., to generate an achievable set point for the controller. This set point can be described in many ways, such as motor current, motor flux etc., but the simplest is as an achievable torque for the current speed, which may or may not be altered based on the current states of any operating factors that may be used to modify the set point. The base speed of an electric machine is defined as the maximum speed at which an electric machine can produce a constant torque. Whilst this definition is applicable for Surface Permanent Magnet motors it is not ideal for other types such as Internal Permanent Magnet, Electrically Excited Synchronous Machines, etc. For these other types of machines the definition ought to be modified to take into account that the constant torque produce by constant phase current, i.e., the phase current described by the Maximum Torque Per Amp (MTPA) or some other such strategy defining efficient operation of the electric machine. The only limiting factor turns out to be the voltage required to support that torque and speed. Hence for speeds above this base speed the electric machine needs to be operated in field weakening.

During the early stages of field weakening the full current capability of the inverter or electric machine may not be fully utilized. As such it is possible to define a set point that is not described by the MTPA, but results in providing the demanded torque, and stays withing the voltage limitation of the power supply voltage. This area of operation is beyond the base speed but still produces the demanded torque, but at the same time, is capable of producing natural boosted voltage.

When the magnet machine 26 is being controlled above its base speed (i.e., the speed at which control of the machine can be contained without using field weakening), the BEMF exceeds the voltage of the power supply 24 when the power converter 22 is turned off between on pulses. As a result, the diodes D1-D6 in parallel with the switches S1-S6 act as a three-phase rectifier. This returning energy would normally be returned to the power supply 24 (typically a battery) and cause a retarding torque on the electric machine. However, if SA and/or SB are switched off the returning energy is blocked from returning to the power supply 24 and as such it flows into the bus capacitor C1 producing a higher voltage on the voltage bus ($+V_{BUS}$) of the power converter 22 compared to the voltage provided by only the power supply 24. This higher voltage on the voltage bus ($+V_{BUS}$) is maintained across both switches SA or SB, or shared across either switch SA or switch SB, dependent upon the number of switches used to achieve isolation of the voltage of the power supply 24 from the voltage bus ($+V_{BUS}$) of the power converter 22. This rectified voltage is termed herein as a "natural boost voltage" that is available for the power converter 22, and in turn, the electric machine 26 at the start of the next on pulse. With this arrangement, BEMF can be used to charge up the bus capacitor when the speed is above field weakening.

Upon turn-on of the power converter 22 with the onset of the next on pulse, the natural boost voltage stored on capacitor C1 is applied to the stator windings of the electric machine 26. Although this natural boost voltage on capacitor C1 eventually decays back to the voltage of the power supply 24, it is applied just when the electric machine 26 needs it the most, that is while transitioning from the off state to the on state at the start of the next pulse. As a result, the set point of the electric machine is reached quicker than if just the voltage of the power supply 24 was applied.

The above is demonstrated for permanent magnetic type electric machines by the following equations:

$$V_d = R_s i_d + \frac{d\psi_d}{dt} + \omega_e \psi_q$$

where:
$V_d$ is phase voltage in the D axis in Volts;
$R_s$ is stator resistance in Ohm;
$i_d$ is phase current in the D axis in Amps;

$$\frac{d\psi_d}{dt}$$

is derivative of the flux in the D axis in Volts;
$\omega_e$ is electrical speed in rad/sec; and
$\psi_q$ is flux in the Q axis in V/s.

$$V_q = R_s i_q + \frac{d\psi_q}{dt} + \omega_e \psi_d$$

where:
$V_q$ is phase voltage in the Q axis in Volts;
$i_q$ is phase current in the Q axis in Amps;

$$\frac{d\psi_q}{dt}$$

is derivative of the flux in the Q axis in Volts; and
$\psi_{d^*}$ is flux in the D axis in V/s=$\psi_{pm}+L_d I_d$
$\psi_{pm}$ is the flux generated by the permanent magnet.

The vector sum of the Vd and Vq gives the line to phase voltage. Which when multiplied by square root of three (3) gives the line to line voltage of the electric machine. For normal operation in motoring or generating without SA and or SB in the circuit needs to be less than the power supply 24 voltage=Vbus.

$$(VBUS) < \sqrt{3(V_d^2 + V_q^2)}.$$

Now $$\frac{d\psi_d}{dt} \text{ and } \frac{d\psi_q}{dt}$$

the derivatives of the flux only have a value other than zero when the flux changes with time and the biggest value will be in response to a step in the flux. Given this, then we can say knowing that the remaining terms of Vd and Vq are constant for a give constant torque and speed, then the greater the voltage difference. Let the constant values of Vd and Vq=Vd' and Vq' then we can think of this as a vector sum $$Vbus = V' + \frac{d\psi'}{dt}$$

so the higher the difference between Vbus and V' the higher the value of $$\frac{d\psi'}{dt}$$

can be supported. It we now assume that ψ is reasonable constant then the larger the value of $$\frac{d\psi'}{dt}$$

that can be supported the smaller will be the value of dt, the response time taken to the step the flux. Another way to look at this is that $$\frac{d\psi'}{dt}$$

will limit the achievable constant values of Vd' and Vq' and therefore limit achieving the setpoint until $$\frac{d\psi'}{dt}$$

decays to allow that setpoint to be achieved.

The torque $T_{em}$ is:

$$T_{em} = \frac{3}{2}P[\psi_{pm}i_q + (\psi_d i_q - \psi_q i_d)]$$

Where:

P is pole pairs.

The torque equation shows how both the flux and currents must achieve their setpoint for the torque to achieve the demanded setpoint.

In motoring or generating this setpoint cannot be achieved until Vbus=voltage of the power supply 24. This is first achieved by the diodes in parallel with SA and/or SB conducting. At such time SA and/or SB should be fully turned on to take the full load current and in doing so minimize the conduction losses in the MOSFET diode combination making up SA and SB.

When the energy provided by the power converter 22 to the electric machine 26 is interrupted between on pulses and SA and/or SB is turned off, energy within the field windings of the electric machine 26 is harvested and stored on the capacitor C1 rather than the power supply 24. With this arrangement, the inherent losses that would be incurred in first storing and then returning the harvested energy to/from the power supply 24 with each on-off cycle is avoided. Also, as the BEMF exceed the voltage of the power supply 24, C1 is charged using the stator as a 3 phase voltage source so even more energy is harvested. Another benefit with this approach is that instead of having to maintain the power converter 22 on to supply field weakening current to the electric machine such that its BEMF stays withing bounds of the voltage power supply 24, it allows the power converter 22 to be turned off, saving additional energy. There is a limit to this due to the voltage rating of the components subjected to Vbus, which increases as a function of speed. As Vbus approaches this limit, less a suitable margin, the power converter 22 is optionally turned back on, allowing field weakening to be applied, limiting the voltage to avoid stressing these components.

Non-Permanent Magnet Machines

Synchronous Reluctance Machines (SynRM), inductance machines, and EESMs are all examples of non-permanent magnet machines.

The equations for calculation $(V_d)$ as the stationary frame voltage in the D axis and $(V_q)$ as the stationary frame voltage in the Q axis, and for calculating torque, are all similar for SynRM, inductance machines, and EESM type machines. These equations are the same as for a permanent magnetic electric machine except that the permanent magnetic flux is replaced with 0 for the SynRM and the electro-magnetic flux generated in the rotor for an EESM:

$$V_d = R_s i_d + \frac{d\psi_d}{dt} + \omega_e \psi_q$$

where:

$V_d$ is phase voltage in the D axis in Volts;
$R_s$ is stator resistance in Ohms;
$i_d$ is phase current in the D axis in Amps:

$$\frac{d\psi_d}{dt}$$

is derivative of the flux in the D axis in Volts;
$\omega_e$ is electrical speed in rad/sec; and
$\psi_q$ is flux in the Q axis in V/s.

$$V_q = R_s i_q + \frac{d\psi_q}{dt} + \omega_e \psi_d$$

where:

$V_q$ is phase voltage in the Q axis in Volts;
$i_q$ is phase current in the Q axis in Amps;

$$\frac{d\psi_q}{dt}$$

is derivative of the flux in the Q axis in Volts; and
$\psi_{d^*}$ is flux in the D axis in V/s=$L_d I_d$ $$(VBUS) < \sqrt{3(V_d^2 + V_q^2)}.$$

Hence, the higher the inverter bus voltage the higher Vd and Vq can be to support a high $$\frac{d\psi_d}{dt} \text{ and } \frac{d\psi_q}{dt}.$$

Therefore, the torque $T_{em}$ is:

$$T_{em} = \frac{3}{2}P[\psi_e i_q + (\psi_d i_q - \psi_q i_d)]$$

Where:
For a SynRM $\psi_e=0$; and
For an EESM $\psi_e=M_d I_r$;
Where: $M_d$ is the mutual inductance between the rotor and the stator in the D axis, and $I_r$ is the rotor current.

In spite of these differences in these equation for the SynRM and EESM, both can generate voltages in excess of the power supply voltage 24 when no energy from the power converter 22 is provided as the magnetic field in the D axis collapses. As a result, both are capable of generating a "natural boost voltage" at the end of an on pulse, during the transition from the on state to the off state, assuming the speed of the electric machine is above the base speed. Harvesting and storing of this excess energy can be stored in capacitor C1 as described above and made available as a "boost" voltage with the onset of the next on pulse.

SynRM Electric Machines

It the case with the SyrRM and other such non-permanent magnet electric synchronous machines, under continuous operation with SA and SB turned on, the motor phase current is controlled using switches S1-S6. Above the base speed, the control set point of the electric machine is such that it tries to provide the torque being demanded within the constraints of the voltage of the power supply 24, and the current limitations of the power converter 22, such that BEMF is less than the voltage of the power supply 24. This is true for motoring and generating.

During pulsed operation, however, if the power converter 22 is prevented from being turned off for just a short period of time at the end of the on pulses, then it is possible to open SA and/or SB in FIG. 5A, and choose a set point for the electric machine so that while generating during this period of time, the resulting generating energy can be harvested and stored on one of the buses (e.g., bus +Vbus) of the power converter 22. As a result, the bus voltage (e.g., +Vbus) is boosted higher than the voltage provided by the power supply 24 just prior to turning the power converter 22 off. Thus, the kinetic or regenerative energy of the system is being used to an additional boost voltage that is stored in capacitor C1. The duration of the short period of time in which the power converter 22 is prevented from being turned off at the end of the on pulses may widely vary. As a general rule, the period is "short" relative to the duration of the entire off period of the power converter 22 between the on pulses.

During motoring, this additional boost energy comes from the load in the form of a retarding torque. Here, the boost energy is derived from the amount of torque multiplied by the speed of the electric machine. Therefore, the amount of boost energy stored in the capacitor C1 is defined by the equation:

$$\text{Boost Energy} = (0.5 \times CV^2)$$

Where:
V=voltage across C1 in volts; and
C is the value of C1 in Farads.

Since the time period the power converter is maintained on is relatively short compared to the DMD off period, it is anticipated that the duration and magnitude of this retarding torque is small. When generating on the other hand, only a small proportion of the returned generated energy is harvested and stored in C1. This energy is in addition to that harvested from the electromagnetic fields in the electric machine, hence provides a mechanism for additional boost voltage.

Furthermore, just as you can apply an electric machines control set point to provide a demanded torque within the constraints of the power supply 24 and the current of the power converter 22, you can also use the set point to regulate the electric machines BEMF and hence boost voltage on C1.

Inductance Machines

The same or a similar process as described above with regard to SyrRMs is also applicable to Inductance Machines (IM) as well. By turning off the switches SA and/or SB at the end of a DMD on pulse, kinetic or regenerative energy reflected to the electric machines shaft can be transferred to capacitor C1 and used to boost the voltage on (+$V_{BUS}$) in anticipation of the next on pulse. Similarly, the magnitude of the boost voltage can be controlled by the set point of the inductance machine regulating the BEMF, and by controlling or adjusting the set point, the boost voltage stored on C1 can be regulated.

Externally Excited Synchronous Machines (EESMs)

EESMs, like other electric machines, include a stator having a plurality of poles and a rotor. EESMs, however, rely on DC current to energize the coils of the rotor, rather than relying on permanent magnets like other types of electric machines as discussed herein. EESMs can operate as either a generator or a motor. When motoring, electrical energy is converted into mechanical energy. When generating, mechanical energy is converted into electrical energy. EESMs are highly efficient, and dependent upon their operation point will have a slightly higher or lower efficiency than their permanent magnet counterparts. EESMs, alternatively, have the advantage of not being reliant on rare earth metals, which generally means manufacturing is less expensive and subject to less disruption due to supply issues.

Figure 5B:
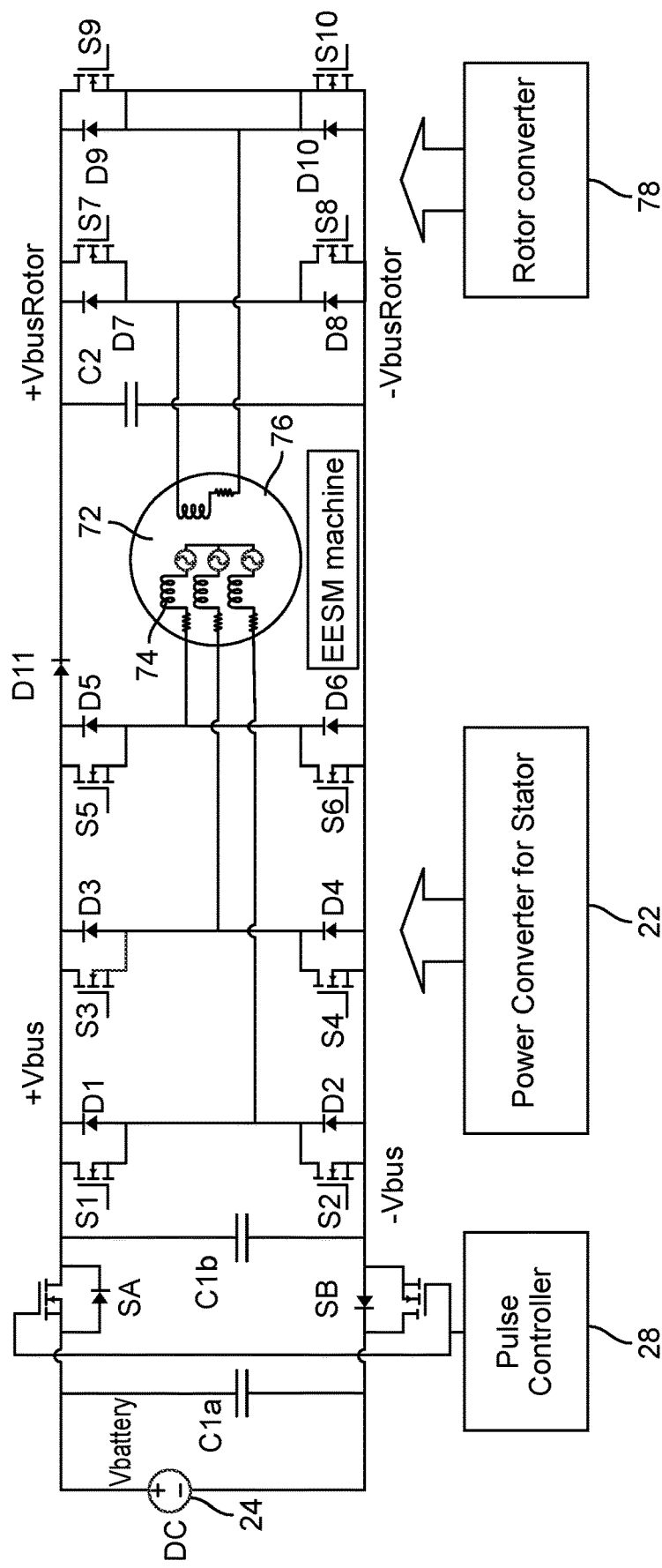
FIG. 5B illustrates an exemplary boost circuit for non-permanent magnet type electric machines in accordance with a non-exclusive embodiment of the present invention respectively.

Referring to FIG. 5B, an EESM 72 is illustrated. The EESM 72 includes a stator 74, a rotor 76, and a rotor converter 78, which includes switch pairs S7-S8 and diodes D7-D8, and switch pairs S9-S9 and Diodes D9-D10, and capacitor C2, all coupled between rotor power supply busses +VbusRotor and −VbusRotor. The EESM 72 further includes a power converter 22 including switch pairs S1-S2, S3-S4, S5-S6 and diodes D1-D4, DC power supply 24, and pulse controller 28, all of which have been previously described. The EESM 72 further includes a boost circuit having a pair of capacitors C1a and C1b, both coupled between the positive and negative rails +Vbus and −Vbus.

With pulsed control, the pulse controller 28 receives a demanded output of the EESM. If the demand is above a threshold, then the EESM is operated in a continuous mode. On the other hand if the demand is less than the threshold, then the pulse controller operates the EESM in the pulsed mode, selecting the magnitude, duty cycle and frequency of the pulses to meet the demand. During pulse control, the pulse controller 28 selectively energizes and de-energizes both the power converter 22 for the stator and the rotor converter 78 for the rotor. As explained below, the BEMF of the EESM is harvested, rectified and stored at the end of the DMD on pulses, as described in more detail below. The harvested and stored energy is then available for the onset of the next pulse, reducing the transition time from the off-state to the on-state.

Due to the fact the EESMs are externally energized, it is possible to boost the rotor field current such that the BEMF exceeds the voltage of the power supply 24. Further, since the rate of change of torque with EESMs is intrinsically linked to the rate of change of the rotor current, then the transition time for on pulses can be reduced by controlling or adjusting the rotor voltage. There are several ways to control or adjust the rotor voltage:

One way is to use the stator 74 to induce a higher "boost" voltage across C1$b$ similar to that described above for permanent magnet, SynRM or IM. That is, when the EESM is de-energized, and the BEMF exceeds the voltage of the power supply 24, the energy returning from the EESM is harvested and stored. This "boost" voltage applied to capacitors C1$a$, C1$b$ and C2 via diode D11. The advantage of storing some of the boost voltage on C2 is that the turn-on of the stator 74 requires relatively more energy than the turn on of the rotor 76. Consequently, the value of C2, which provides a boost to the rotor 76, can be smaller than C1$b$. Also, since the ability to efficiently reduce the torque to zero is dominated by the rotor time constant, this turn off period can be utilized to augment the electromagnetic field harvested energy by inducing a BEMF that exceeds the battery voltage, hence charging C1$b$ and in turn C2. Likewise the ability to increase the torque efficiently to the desired value for the on period is also dominated by the rotor time constant. In practice it has been found that during this on transition only the rotor achieves voltage saturation. Therefore, there is no need for the stator to have a boosted voltage—hence C1$b$ can be a lot smaller than C1$a$. Since C2 and C1$b$ can both be relatively small, this embodiment is practical to implement. Furthermore the amount of energy harvested for the boost voltage is relatively small, so the overall effect on systems performance in harvesting this energy is reduced.

Another way is to use the mutual coupling between the stator 74 D axis and rotor 76 to transfer energy to the stator boost capacitor C2 whilst the stator 74 is turned off. The current induced in the stator 74 will then couple through the mutual inductance to the rotor 76 where it will induce a current flow. With the rotor converter 78 off, S7-10 off, this current will induce a voltage across the windings of the rotor 76, which is applied to diodes D7-10, causing D7 and D9 to conduct, while D8 and D10 do not. Also, D11 will not conduct, preventing the induced current from flowing back to the power supply 24. As a result, the induced current is applied to C2, causing the capacitor to charge, creating a boost voltage. Note, the mutual inductance of the stator 74 is strongest in the D axis and any current in solely the D axis will not produce any shaft torque on the EESM. Hence, there will be no torque disturbances using this method Furthermore, the period of time that this boosted voltage is available can be readily extended by delaying the turn off of the stator 74 and its power converter.

With the above-defined arrangement, C1$a$ is across the power supply voltage 24, C1$b$ is across the power converter 22 for the stator, and C2 is across the rotor converter 78. (C1$a$+C1$b$) represents the capacitance that you would find in a conventional and is present to support the inverter ripple current. However since the goal is to boost the rotor voltage, the capacitance of C2 should be selected to be just large enough to support the energy required to re-energize the rotor as quickly as reasonably possible. C1$b$ should be chosen to protect the stator power devices S1-6 from induced voltage stress due to circuit stray inductances reactance to changes in current in the stator inverter power circuitry.

It should also be noted that the boosted voltage on C2 only needs to be present for a period of time at the start of the next on pulse to accelerate the energization of the rotor 76. Once the rotor is close to regulation the voltage required will be less than the voltage of the power supply 24 allowing the boost voltage on C2 to collapse to the voltage of the power supply 24. When this happens D11 conducts allowing the rotor to be supplied directly from the power supply 24.

It should also be noted that once any of the diodes with parallel MOSFETS start to conduct it is possible to turn on that parallel MOSFET to reduce the conduction voltage across the pair. This will reduce the overall operational losses of this boost circuit.

An alternative location for C2 is across D11. This solution reduces the voltage rating of the capacitor and consequently the physical size and cost of that capacitor.

Boost Circuit Embodiments

With the above-described embodiment, many of the existing electric components of the rotor converter 60, with a few additional components as described herein, are used to harvest, store, and apply a boost voltage. Since many already existing elements of the rotor converter 60 are used, the benefits of faster transition times are realized almost for "free", with little overhead in terms of additional circuitry or components.

It is further noted that the specific components mentioned herein are merely exemplary and in no manner should be construed as limiting. On the contrary, any type of components may be used to bring about the functionality and operation of the boost circuit 62 and/or boost controller 63 as described herein.

Pulse Control Operation with Boost

The above described four modes may be continually repeated while the electric machine is operating in the pulsed mode. With each on-off cycle, the regulation, harvesting, and boost (and optionally the topping up) modes are repeated. By repeating this process with each pulse, the overall efficiency of the electric machine can be significantly improved as the transition times for turning on the rotor from the off to the on states with each pulse is significantly reduced.

Figure 6:
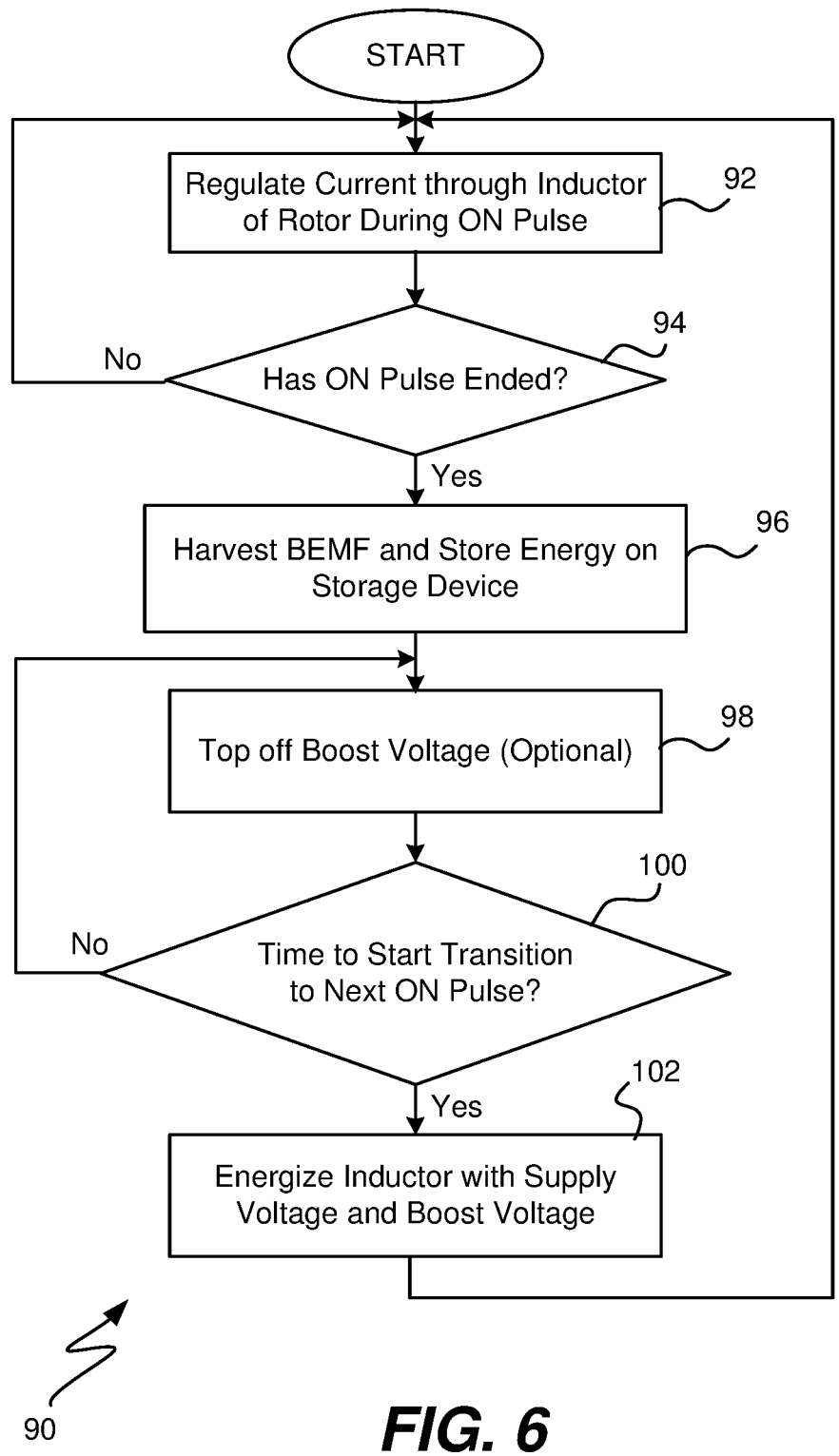
FIG. 6 is a flow diagram illustrating steps for operating an electric machine pulsed operation in accordance with a non-exclusive embodiment of the invention.

Referring to FIG. 6, a flow diagram 90 illustrating steps for efficiently operating an electric machine is illustrated.

In the initial step 92, electric machine 60 is in the on state during an on pulse, and the target operating current through the rotor winding L1 is precisely regulated using hysteresis as described herein.

In decision step 94, the boost controller 93 determines when the current pulse has ended.

In step 96, the boost controller 93 takes steps to harvest the BEMF energy induced in the rotor winding L1 as the electric machine transitions from the on state to the off state at the end of the pulse. The harvested energy is stored on a storage device C1 as a boost voltage.

In an optional step 98, the boost voltage stored on storage device C1 may optionally be topped off.

In decision step 100, the boost controller 93 determines if it is time to start a transition from the off state to the on state for the next on pulse.

Finally, in step 102, the rotor winding is energized with the combination of both the supply voltage V1 and the boost voltage from the storage device C1 as the electric machine transitions from the off state to the on state at the start of the next pulse. With the extra boost voltage, the transition time is reduced relative to if the boost voltage was not applied.

If there is insufficient time to top up the energy stored in C1 during step 98 then this may be done between step 92 and 94.

The steps 92 through 102 are preferably continually repeated for each pulse as the electric machine cycles between the off and on states. In this way, the boost voltage is harvested at the end of each pulse, stored, and applied to the rotor winding at the start of the next pulse. Consequently, the time for transitioning between the off state and the on state for each on pulse is significantly reduced, improving the overall operational efficiency of the electric machine.

The Applicants have found that the use of a boost voltage as described herein has significantly reduced the transition time from the off state to the on state compared to any non-boosted electric machine equivalents. As a result, the overall efficiency of such electric machines is significantly improved.

Generator Operation

Although the above description has been largely directed to the operation of an electric machine as a motor. In no way should this be construed as limiting. On the contrary, a boost voltage to the rotor winding as described herein can also be used during pulsed control operation as a generator as well.

Electric Machine Types

It should be apparent from the foregoing description that the described boosted pulsed machine control can be utilized in electric machine having externally excited fields. The present invention should, therefore, be broadly construed to include any such machines and not just those explicitly mentioned herein.

Electric Machines and Vehicles

Electric vehicles are now common and are increasing in popularity. It has been predicted that over the course of the next decade or two, electric vehicles will surpass or altogether replace conventional internal combustion engine vehicles.

With electric vehicles, one or more onboard machines is/are provided. When driving the vehicle, the machine acts as a motor to generate torque, which in turn, is used to propel the vehicle. In the case of an electric vehicle, the electric machine(s) is/are used exclusively to generate the needed torque. The torque may be a positive torque to propel the vehicle or a negative torque to transfer vehicle kinetic energy into stored electrical energy. With hybrid vehicles, the onboard electric machines may be used either exclusively, or in cooperation with, an internal combustion engine, to propel the vehicle. With regenerative braking, the machine is typically used to convert mechanical energy into electrical energy that is stored in a storage device, such as a battery or capacitor. The stored energy can be used by the electric machine when operating as a motor, or alternatively to power other electrical bs on the vehicle, such as the air conditioner, heater, defroster, various lighting systems, entertainment system, etc.

The pulsing of an onboard electric machine, with boost voltages as described herein, on a vehicle promises significant advantages for increased efficiency. By increasing efficiency, the range of the vehicle can be increased before either a battery recharge is needed and/or refueling is needed as is the case with hybrids.

Additional Embodiments

Motors used in Heating, Ventilation and Air Conditioning (HVAC) applications are another good example of an application that can benefit from pulsed control. There are several factors that contribute to pulsed motor control being a good fit for HVAC applications. These include the facts that: (a) the motors used in HVAC applications today are predominantly induction motors that don't contain permanent magnets; (b) a high percentage of the motors used in HVAC applications, including in particular variable speed HVAC condensers and/or air handlers, operate a substantial portion of the time operating regions below their high efficiency areas; and (c) the inertia of a fan or pump normally dominates the motor inertia, which tends to further mitigate potential NVH related impacts associated with pulsing.

Although only a few embodiments of the invention have been described in detail, it should be appreciated that the invention may be implemented in many other forms without departing from the spirit or scope of the invention. The various described pulse controllers and other control elements may be implemented, grouped, and configured in a wide variety of different architectures in different embodiments. For example, in some embodiments, the pulse controller may be incorporated into a motor controller or an inverter controller or it may be provided as a separate component. Similarly, for a generator, the pulse controller may be incorporated into a generator controller or a rectifier controller and in combined motor/generators the pulse controller may be incorporated into a combined motor/generator controller or a combined inverter/rectifier controller. In some embodiments, the described control functionality may be implemented algorithmically in software or firmware executed on a processor—which may take any suitable form, including, for example, general purpose processors and microprocessors, DSPs, etc.

Generally, the schemes for pulsed motor control may be implemented digitally, algorithmically, using analog components, or using hybrid approaches. The pulse generator and/or the motor controller may be implemented as code executing on a processor, on programmable logic such as an FPGA (field programmable gate array), in circuitry such as an ASIC (application specific integrated circuit), on a digital signal processor (DSP), using analog components, or any other suitable piece of hardware. In certain me implementations, the described control schemes may be incorporated into object code to be executed on a digital signal processor (DSP) incorporated into an inverter controller (and/or rectifier controller in the context of a generator and/or a combined inverter/rectifier controller).

Therefore, the present embodiments should be considered illustrative and not restrictive, and the invention is not to be limited to the details given herein but may be modified within the scope and equivalents of the app ended claims.

What is claimed is:

1. An apparatus, comprising:
a power supply for providing a power supply voltage;
an electric machine;
a power converter couple between the power supply and the electric machine;
a pulse controller configured to selectively operate the electric machine in a pulsed mode where a work output is generated during on pulses when the electric machine is in an on-state and little to no work output is generated when the electric machine is in an off-state between on pulses; and
a boost circuit, coupled to the electric machine, the boost circuit configured to:
(a) harvest and store energy in a storage device when Back Electromagnetic Force (BEMF) energy from the electric machine exceeds the power supply voltage when the electric machine is in the off-state between pulses or transitioning from the on-state to the off-state following the end of the on pulses, and
(b) apply the stored energy from the storage device to the electric machine when transitioning from the off-state to the on-state at the onset of subsequent on pulses respectively.

2. The apparatus of claim 1, wherein the storage device is a capacitor coupled to a power rail of the power converter.

3. The apparatus of claim 1, wherein the harvested energy is derived from rectifying the BEMF energy and then storing the rectified BEMF energy in the storage device.

4. The apparatus of claim 1, wherein the BEMF energy is generated from a natural decay of flux from a rotor of the electric machine as the electric machine is de-energized when in the off-state or transitioning from the on-state to the off-state following the end of the on pulses.

5. The apparatus of claim 1, further comprising one or more switches that are coupled between the power supply and the power converter, the one or more switches selectively operated so that:
(a) the power supply voltage from the power supply is used to power the power converter during the on pulses, but
(b) de-couples the power supply and the power converter when the electric machine is in the off-state or transitioning from the on-state to the off-state following the end of the on pulses so that the harvested energy is isolated from the power supply and is instead directed to the storage device for storage.

6. The apparatus of claim 1, wherein the storage device is a capacitor that is coupled to a power rail of the power converter and one or more switches are provided on an electrical connection between the power rail and the power supply, the one or more switches acting to selectively couple the power rail to the power supply or electrically isolate the capacitor coupled to the power rail from the power supply.

7. The apparatus of claim 1, wherein the pulse controller is configured to operate the electric machine in the pulsed mode when an ascertained demand placed on the electric machine is below a threshold and is further configured to operate the electric machine in a continuous mode when the ascertained demand is above the threshold.

8. The apparatus of claim 7, wherein the threshold is derived from one of the following:
(a) a peak or near peak efficiency range for the electric machine; or
(b) the peak or near peak efficiency range for the electric machine, but modified by one or more other factors, including any of (i) Noise, Vibration and Harshness (NVH), factor(s) that mask NVH, or (iii) factor(s) that accentuate NVH.

9. The apparatus of claim 1, further comprising an electric or hybrid vehicle and the pulse controller is configured to operate the electric machine in either the pulsed mode or a continuous mode to generate energy to drive the electric or hybrid vehicle.

10. The apparatus of claim 1, wherein the pulse controller is further configured to:
receive a torque demand for the electric machine;
derive a set point for operating the electric machine from the received torque demand; and
operate the electric machine in the pulsed mode when the set point meets or exceeds a threshold,
wherein the storage device alternating:
(a) harvesting and storing the energy in a storage device when the electric machine is in the off-state or transitioning from the on-state to the off-state following the end of the on pulses, and
(b) apply the stored energy to the electric machine when transitioning from the off-state to the on-state at the onset of the on pulses respectively.

11. The apparatus of claim 10, wherein the set point is derived from the torque demand and is selectively modified using one of the following:
(a) current of the electric machine;
(b) flux of the electric machine;
(c) a speed of the electric machine;
(d) temperature; or
(e) any combination of (a) through (d).

12. The apparatus of claim 1, wherein the BEMF is harvested and stored during operation of the electric machine in the pulsed mode when a speed of the electric machine is above a field weakening based speed for the electric machine.

13. The apparatus of claim 1, wherein the pulse controller is further configured to maintain the power converter on for an extra period of time at the end of the on pulses while operating in electric machine in the pulsed mode, the storage device configured to harvest and store additional energy from the electric machine during the extra period of time.

14. The apparatus of claim 1, wherein the power converter is configured to provide multi-phase power to the electric machine when operating as a motor and act as a power rectifier when the electric machine is operating as a generator.

15. The apparatus of claim 1, wherein the pulse controller is further configured to set a magnitude, a duty cycle, and a frequency for the on pulses when operating the electric machine in the pulsed mode.

16. The apparatus of claim 1, wherein the electric machine is either a non-permanent magnet electric machine or a permanent magnet electric machine.

17. The apparatus of claim 1, wherein the electric machine is one of the following:
an Interior Permanent Magnet Synchronous Machine IPMSM);
Surface Permanent Magnet Synchronous Machine (SPMSM);
Synchronous Reluctance Machine (SynRM);
Electrically Excited Synchronous Machines (EESMs); or
Inductance Machines (IM).

18. An Externally Excited Synchronous Machine (EESM), comprising:
a stator;

a rotor having coils configured to be energized by an external current source;

a stator converter coupled to the stator of the EESM;

a rotor power converter couple to the rotor of the EESM;

a power supply for providing a power supply voltage to the EESM;

a pulse controller for selectively operating the EESM in a pulsed mode where a work output is generated during on pulses when the EESM is in an on-state and little to no work output is generated when the EESM is in an off-state between on pulses; and a boost circuit configured to:
(a) harvest and store energy in a storage device when Back Electromagnetic Force (BEMF) energy from a field current of the rotor exceeds the power supply voltage when the EESM is in the off-state or transitioning from the on-state to the off-state following the end of on pulses, and
(b) apply the stored energy from the storage device to the EESM when transitioning from the off-state to the on-state at the onset of the on pulses respectively.

19. The EESM of claim 18, wherein the coils of the rotor are configured to be energized so as to boost the field current of the rotor sufficiently such that the BEMF energy exceeds the power supply voltage.

20. The EESM of claim 18, wherein the BEMF energy is transferred and stored on a capacitor coupled to a first rotor power rail of the rotor power converter.

21. The EESM of claim 19, wherein the BEMF energy is generated by de-energizing the stator, causing a current to be induced in the stator that is mutually coupled with the rotor, thereby inducing a current through the rotor.

22. The EESM of claim 21, further comprising one or more first switches to direct the induced rotor current to the capacitor coupled to the first power rail of the rotor power converter, while preventing the induced rotor current from flowing to a second rotor power rail of the rotor power converter.

23. The EESM of claim 22, further comprising one or second switches that prevent the induced rotor current from flowing to the power supply.

24. The EESM of claim 19, wherein the BEMF energy is transferred and stored on a first capacitor and a second capacitor.

25. The EESM of claim 24 wherein the first capacitor is coupled to a first stator power rail of the stator power converter.

26. The EESM of claim 24, wherein the second capacitor is coupled to a first rotor power rail of the rotor power converter.

27. The EESM of claim 24, wherein the second capacitor is smaller than the first capacitor.

28. The EESM of claim 24, wherein the BEMF energy is transferred and stored on a third capacitor in addition to the first capacitor and the second capacitor.

29. The EESM of claim 24, wherein the third capacitor is coupled to a first stator power rail of the stator power converter.

30. The EESM of claim 24, wherein the sum of the first capacitor and the second capacitor is smaller than the third capacitor.

31. The EESM of claim 24, further comprising one or more switches to selectively isolate the first capacitor and the second capacitor from the power supply.

32. The EESM of claim 18, wherein the pulse controller is further configured to operate the EESM in the pulsed mode when a demanded output of the EESM is below a threshold and in a continuous mode when the demanded output is above the threshold.

33. The EESM of claim 32, wherein the threshold is derived from one of the following:
(a) a peak or near peak efficiency range for the electric machine; or
(b) the peak or near peak efficiency range for the electric machine, but modified by one or more other factors, including any of (i) Noise, Vibration and Harshness (NVH), factor(s) that mask NVH, or (iii factor(s) that accentuate NVH.

34. The EESM of claim 32, wherein the pulse controller is further configured to control the stator power converter and rotor power converter to selectively operate in either the pulsed mode or the continuous mode.

35. The EESM of claim 18, further comprising either an electric of hybrid vehicle and the pulse controller is further configured to operate the EESM, to propel the electric or hybrid vehicle in either the pulse mode or a continuous mode depending on a torque demand requested of the EESM.

* * * * *